US012252264B2

(12) United States Patent
Guerchkovitch et al.

(10) Patent No.: US 12,252,264 B2
(45) Date of Patent: *Mar. 18, 2025

(54) PARALLEL CONTROL LOOPS FOR HYBRID ELECTRIC AIRCRAFT

(71) Applicant: PRATT & WHITNEY CANADA CORP., Longueuil (CA)

(72) Inventors: Leonid Guerchkovitch, Dollard-des-Ormeaux (CA); Manuj Dhingra, Glastonbury, CT (US); Boris Karpman, Marlborough, CT (US); Aaron J. Kaufman, Manchester, CT (US)

(73) Assignee: PRATT & WHITNEY CANADA, CORP., Longueuil (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,151

(22) Filed: Sep. 19, 2023

(65) Prior Publication Data

US 2024/0002065 A1 Jan. 4, 2024

Related U.S. Application Data

(63) Continuation of application No. 16/874,912, filed on May 15, 2020, now Pat. No. 11,794,917.

(51) Int. Cl.
*B64D 31/06* (2024.01)
*B64D 27/02* (2006.01)
(Continued)

(52) U.S. Cl.
CPC ............. *B64D 31/06* (2013.01); *B64D 27/24* (2013.01); *B64D 31/00* (2013.01); *B64D 27/026* (2024.01)

(58) Field of Classification Search
CPC ...................................................... B64D 31/06
See application file for complete search history.

(56) References Cited

U.S. PATENT DOCUMENTS 6,496,397 B2    12/2002   Sakai et al.
7,023,216 B2     4/2006   Prema et al.
(Continued)

FOREIGN PATENT DOCUMENTS

EP      1129891 A2    9/2001
EP      2482438 A2    8/2012
(Continued)

OTHER PUBLICATIONS

Gartenberg, Lenny, Battery Centric Serial Hybrid Aircraft Performance and Design, Embry-Riddle Aeronautical University, "Battery Centric Serial Hybrid Aircraft Performance and Design Space" (2017), Dissertations and Theses. 327 (https://commons.erau.edu/edt/327)(hereinafter "Gartenberg").*

(Continued)

*Primary Examiner* — Jean Paul Cass
(74) *Attorney, Agent, or Firm* — Norton Rose Fulbright Canada LLP

(57) ABSTRACT

A method of controlling a hybrid-electric aircraft powerplant includes running a first control loop for command of a thermal engine based on error between total response commanded for a hybrid-electric powerplant and total response from the hybrid-electric powerplant. A second control loop runs in parallel with the first control loop for commanding the thermal engine based on error between maximum thermal engine output and total response commanded. A third control loop runs in parallel with the first and second control loops for commanding engine/propeller speed, wherein the third control loop outputs a speed control enable or disable status. A fourth control loop runs in parallel with the first, second, and third control loops for commanding the electric (Continued)

motor with non-zero demand when the second control loop is above control to add response from the electric motor to response from the thermal engine to achieve the response commanded.

6 Claims, 1 Drawing Sheet

(51) Int. Cl.
*B64D 27/24* (2024.01)
*B64D 31/00* (2024.01)

(56) References Cited

U.S. PATENT DOCUMENTS

| | | | |
|---|---|---|---|
| 7,358,698 | B2 | 4/2008 | Seguchi et al. |
| 7,425,806 | B2 | 9/2008 | Schnetzka et al. |
| 7,513,119 | B2 | 4/2009 | Zielinski et al. |
| 7,772,791 | B2 | 8/2010 | Lim et al. |
| 8,047,420 | B2 | 11/2011 | Stroh |
| 8,155,801 | B2 | 4/2012 | Chang et al. |
| 8,169,179 | B2 | 5/2012 | Mohan et al. |
| 8,196,299 | B2 | 6/2012 | Lee et al. |
| 8,279,620 | B2 | 10/2012 | Herron et al. |
| 8,376,069 | B2 | 2/2013 | Nakatsu et al. |
| 8,423,214 | B2 | 4/2013 | Kshatriya |
| 8,587,977 | B2 | 11/2013 | Nishikimi et al. |
| 8,610,382 | B2 | 12/2013 | Goldammer et al. |
| 8,648,559 | B2 | 2/2014 | Singh |
| 8,727,271 | B2 | 5/2014 | Salyer |
| 8,831,816 | B2 | 9/2014 | Kwon et al. |
| 8,831,864 | B1 | 9/2014 | Chen et al. |
| 8,868,278 | B2 | 10/2014 | Amano |
| 8,931,732 | B2 | 1/2015 | Sirohi et al. |
| 8,958,936 | B2 | 2/2015 | Treharne et al. |
| 8,964,424 | B2 | 2/2015 | Sakakibara |
| 9,045,223 | B2 | 6/2015 | Connaulte et al. |
| 9,077,257 | B2 | 7/2015 | Frium |
| 9,174,741 | B2 | 11/2015 | Suntharalingam et al. |
| 9,181,866 | B2 | 11/2015 | Jensen et al. |
| 9,341,145 | B2 | 5/2016 | Maier |
| 9,370,992 | B2 | 6/2016 | Holmes et al. |
| 9,496,802 | B2 | 11/2016 | Matsumoto |
| 9,561,860 | B2 | 2/2017 | Knapp et al. |
| 9,564,257 | B2 | 2/2017 | Karlen et al. |
| 9,647,556 | B2 | 5/2017 | Li et al. |
| 9,714,025 | B2 | 7/2017 | Yang et al. |
| 9,787,217 | B2 | 10/2017 | Hu et al. |
| 9,789,768 | B1 | 10/2017 | Meier |
| 9,853,573 | B2 | 12/2017 | Siri |
| 9,923,485 | B2 | 3/2018 | Fu et al. |
| 9,937,803 | B2 | 4/2018 | Siegel et al. |
| 9,954,335 | B2 | 4/2018 | Hasegawa et al. |
| 10,000,202 | B2 | 6/2018 | Park et al. |
| 10,006,375 | B1 | 6/2018 | Wagner et al. |
| 10,040,566 | B2 | 8/2018 | Waltner |
| 10,122,165 | B2 | 11/2018 | Zare |
| 10,124,886 | B2 | 11/2018 | Perkins et al. |
| 10,131,442 | B2 | 11/2018 | Waltner et al. |
| 10,137,981 | B2 | 11/2018 | Miller et al. |
| 10,141,829 | B2 | 11/2018 | Fullmer et al. |
| 10,145,291 | B1 | 12/2018 | Thomassin et al. |
| 10,183,664 | B2 | 1/2019 | Yang et al. |
| 10,207,698 | B2 | 2/2019 | Kim et al. |
| 10,273,019 | B2 | 4/2019 | Sands et al. |
| 10,351,253 | B2 | 7/2019 | Dong et al. |
| 10,374,329 | B2 | 8/2019 | Ruess et al. |
| 10,382,225 | B2 | 8/2019 | Dormiani et al. |
| 10,425,032 | B2 | 9/2019 | Tapadia et al. |
| 10,432,129 | B2 | 10/2019 | Mori et al. |
| 2005/0209752 | A1* | 9/2005 | Ono ................ B62D 5/008 701/41 |
| 2011/0168835 | A1 | 7/2011 | Oliver |
| 2011/0198439 | A1 | 8/2011 | Rotger et al. |
| 2012/0119020 | A1 | 5/2012 | Burns et al. |
| 2012/0153076 | A1 | 6/2012 | Burns et al. |
| 2013/0087654 | A1 | 4/2013 | Seibt |
| 2013/0181088 | A1 | 7/2013 | Casado Montero et al. |
| 2013/0261853 | A1* | 10/2013 | Shue ................ G05D 1/0858 701/3 |
| 2013/0293163 | A1* | 11/2013 | Flett ................ B60L 53/20 318/139 |
| 2013/0341934 | A1 | 12/2013 | Kawanishi |
| 2014/0138479 | A1 | 5/2014 | Vieillard et al. |
| 2014/0158816 | A1 | 6/2014 | DeLorean |
| 2014/0345281 | A1 | 11/2014 | Galbraith |
| 2015/0042155 | A1 | 2/2015 | Vieillard et al. |
| 2015/0353189 | A1 | 12/2015 | Kharitonov |
| 2016/0122007 | A1 | 5/2016 | Cox et al. |
| 2016/0375994 | A1 | 12/2016 | Rossotto |
| 2017/0066539 | A1 | 3/2017 | van der Westhuizen et al. |
| 2018/0002025 | A1 | 1/2018 | Lents et al. |
| 2018/0134413 | A1 | 5/2018 | Halsey et al. |
| 2018/0208305 | A1 | 7/2018 | Lloyd et al. |
| 2018/0346139 | A1 | 12/2018 | Ferran et al. |
| 2018/0354615 | A1 | 12/2018 | Groninga et al. |
| 2018/0363564 | A1* | 12/2018 | Geneste ............ H02K 7/1823 |
| 2019/0024127 | A1 | 1/2019 | Yeh |
| 2019/0031333 | A1 | 1/2019 | Groninga et al. |
| 2019/0241274 | A1* | 8/2019 | Hunkel ............ H02J 7/345 |
| 2020/0140106 | A1 | 5/2020 | Dougherty |
| 2020/0277063 | A1* | 9/2020 | Thomassin ............ B64D 31/06 |
| 2020/0277064 | A1* | 9/2020 | Thomassin ............ B64D 31/14 |
| 2020/0277071 | A1* | 9/2020 | LaTulipe ............ B64D 27/24 |
| 2020/0277073 | A1* | 9/2020 | Thomassin ............ F02C 7/22 |
| 2020/0277075 | A1* | 9/2020 | Dubreuil ............ H02K 11/25 |
| 2020/0298988 | A1* | 9/2020 | LaTulipe ............ B64D 35/025 |
| 2021/0009282 | A1* | 1/2021 | Long ............ B64D 31/18 |
| 2021/0101691 | A1* | 4/2021 | Mark ............ B64D 31/06 |
| 2021/0354841 | A1* | 11/2021 | Poisson ............ B64D 31/02 |
| 2021/0354842 | A1* | 11/2021 | Guerchkovitch ......... B64F 5/60 |
| 2021/0354843 | A1* | 11/2021 | Guerchkovitch .... B64D 35/025 |
| 2023/0054112 | A1* | 2/2023 | Rollins ............ B01F 35/21 |

FOREIGN PATENT DOCUMENTS

| | | | | |
|---|---|---|---|---|
| EP | 2889221 | A1 | 7/2015 | |
| EP | 3163990 | A1 | 5/2017 | |
| EP | 3090951 | B1 | 12/2018 | |
| EP | 3434592 | | 1/2019 | |
| EP | 3547528 | A1 | 10/2019 | |
| EP | 3936712 | A1* | 1/2022 | ............ B60L 3/0023 |
| EP | 3992085 | A1* | 5/2022 | ............ B64D 27/02 |
| JP | 2011006041 | | 1/2011 | |
| JP | 2017121925 | | 7/2017 | |
| KR | 20130073244 | A | 7/2013 | |
| KR | 101615486 | B1 | 4/2016 | |
| KR | 101682670 | B1 | 12/2016 | |
| WO | 2008125077 | | 10/2008 | |
| WO | 2011037852 | | 3/2011 | |
| WO | 2014137365 | | 9/2014 | |
| WO | 201682325 | | 6/2016 | |
| WO | 201733320 | | 3/2017 | |
| WO | 2017114643 | A1 | 7/2017 | |
| WO | 2018191769 | A1 | 10/2018 | |
| WO | 2018/227270 | | 12/2018 | |
| WO | WO-2020180380 | A1* | 9/2020 | ............ B64D 27/10 |

OTHER PUBLICATIONS

Google machine translation of Japanese Patent Pub. No. JP6144404B1 to Kawasaki filed on Dec. 27, 2016.*

European Patent Office, Extended European Search Report for European Patent Application No. EP21174211.9, dated Oct. 14, 2021.

* cited by examiner

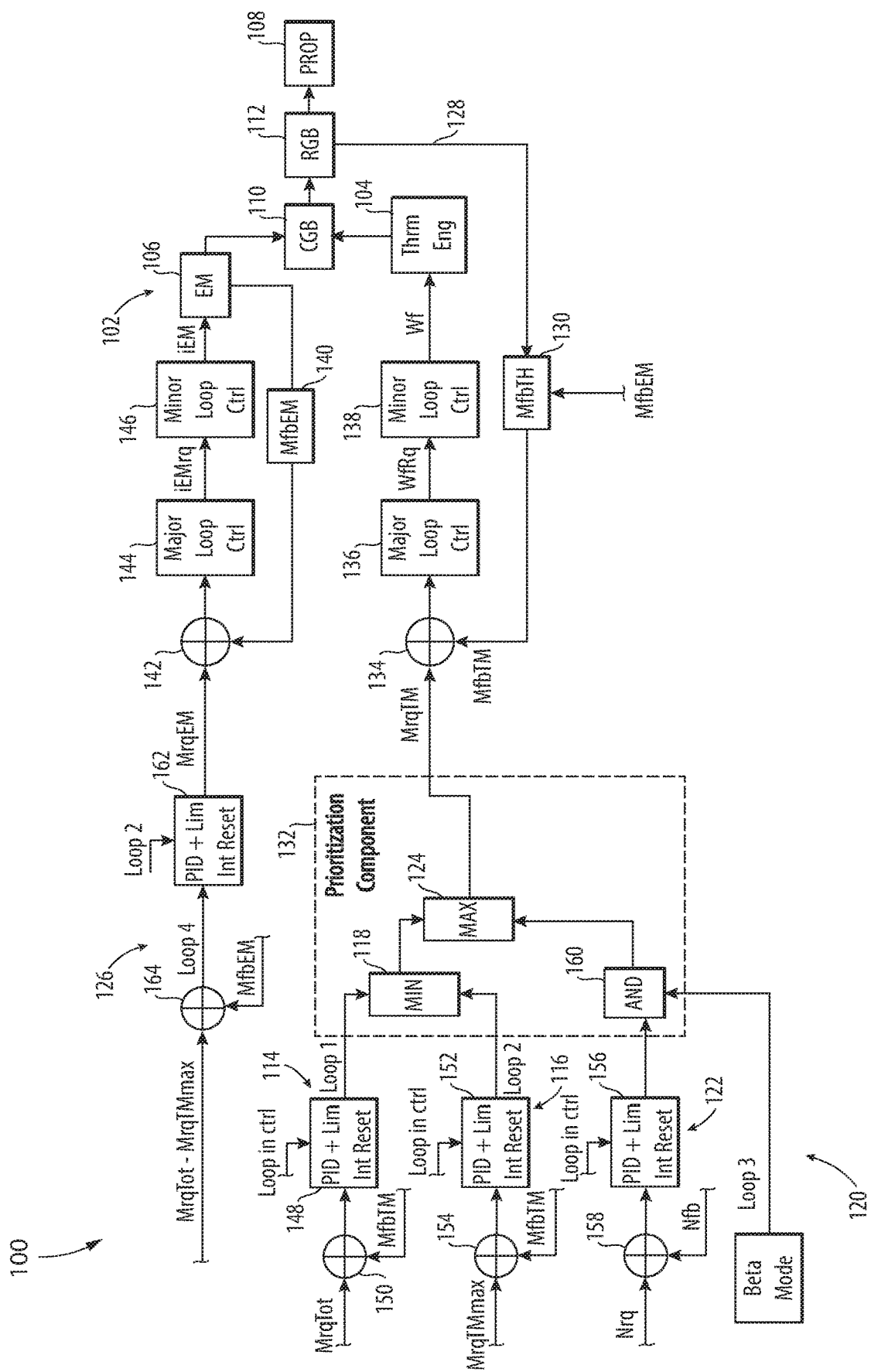

PARALLEL CONTROL LOOPS FOR HYBRID ELECTRIC AIRCRAFT

CROSS REFERENCE TO RELATED APPLICATION

This application is a continuation of U.S. patent application Ser. No. 16/874,912 filed on May 15, 2020, the entire contents of which are hereby incorporated by reference.

BACKGROUND

1. Field

The present disclosure relates to control schemes for aircraft, and more particularly to control loops for hybrid electric aircraft.

2. Description of Related Art

To control the power request for a hybrid electric aircraft, the control system is required to calculate the power request for both the thermal engine and the electric motor system components. In addition, e.g. for a turboprop aircraft, a propeller/engine speed is commanded for the low speed/power portion of flight.

It is required to transition into and out of the various control loops without any adverse transient or steady state effects while meeting the constraints of the electrical and thermal engine such as maximum output, response rate, protection functions, and the like.

The conventional techniques have been considered satisfactory for their intended purpose. However, there is an ever present need for improved systems and methods for control loops for hybrid electric aircraft. This disclosure provides a solution for this need.

SUMMARY

A method of controlling a hybrid-electric aircraft powerplant includes, for a hybrid-electric aircraft powerplant having a thermal engine and an electric motor, running a first control loop for command of the thermal engine based on error between total response commanded for the hybrid-electric powerplant and total response from the hybrid-electric powerplant. The method includes running a second control loop in parallel with the first control loop for commanding the thermal engine based on error between maximum thermal engine output and total response commanded. The method includes using a low selector between the first control loop and the second control loop to command the thermal engine with the lower of responses commanded from the first and second control loops. The method includes running a third control loop in parallel with the first and second control loops for commanding engine/propeller speed, wherein the third control loop outputs a speed control enable or disable status, and using a high selector between output of the third control loop and the low selector. The method includes running a fourth control loop in parallel with the first, second, and third control loops for commanding the electric motor with non-zero demand when the second control loop is above control to add response from the electric motor to response from the thermal engine to achieve the response commanded.

The response in total response commanded and total response in the first control loop can be torque. The response in the total response commanded in the second control loop can be torque. The response in the fourth control loop can be torque.

Commanding the thermal engine can include controlling fuel flow to the thermal engine. Commanding the electric motor can include controlling electrical power supplied to the electric motor. The electric motor and thermal engine can be connected together in parallel to a combining gear box (CGB) to drive a propeller. The combining gear box can connect to the propeller through a reduction gear box (RGB). Sensory feedback from the RGB can be combined with sensory feedback from the electric motor to determine torque feedback from the thermal engine.

A system includes a hybrid-electric powerplant for an aircraft including a thermal engine and an electric motor each operatively connected to provide torque to drive an air mover for thrust. A first control loop is connected for command of the thermal engine based on error between total response commanded for the hybrid-electric powerplant and total response from the hybrid-electric powerplant. A second control loop is connected in parallel with the first control loop for commanding the thermal engine based on error between maximum thermal engine output and total response commanded. A low selector is connected between the first control loop and the second control loop to command the thermal engine with the lower of responses commanded from the first and second control loops. A third control loop is connected in parallel with the first and second control loops for commanding engine/propeller speed, wherein the third control loop outputs a speed control enable or disable status. A high selector is connected between output of the third control loop and the low selector. A fourth control loop is connected in parallel with the first, second, and third control loops for commanding the electric motor with non-zero demand when the second control loop is above control to add response from the electric motor to response from the thermal engine to achieve the response commanded.

The air mover can be a propeller. The electric motor and thermal engine can be connected together in parallel to a combining gear box (CGB) to drive the propeller. The combining gear box can connect to the propeller through a reduction gear box (RGB).

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain FIGURES, wherein:

FIG. 1 is a schematic view or simulation diagram of an embodiment of a system constructed in accordance with the present disclosure, showing the four parallel control loops.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. The systems and methods described herein can be used for controlling hybrid-electric powerplants such as for driving air movers for aircraft thrust.

The system 100 includes a hybrid-electric powerplant 102 for an aircraft including a thermal engine 104 and an electric motor 106 each operatively connected to provide torque to drive an air mover, e.g. propeller 108, for thrust. The air mover is a propeller 108, however those skilled in the art will readily appreciate that any other suitable type of air mover such as a fan, ducted fan, or the like can be used without departing from the scope of this disclosure. The electric motor 106 and thermal engine 104 are connected together in parallel to a combining gear box (CGB) 110. The CGB 110 connects to the propeller 108 through a reduction gear box (RGB) 112.

A first control loop 114 is connected for command of the thermal engine 104 based on error between total torque (MrqTot) commanded, e.g. commanded from a pilot or autonomous system, for the hybrid-electric powerplant 102 and total response from the hybrid-electric powerplant (MfbTM, torque feedback from the thermal engine 104). Commanding the thermal engine 104 includes controlling fuel flow to the thermal engine.

A second control loop 116 is connected in parallel with the first control loop 114 for commanding the thermal engine 104 based on error between maximum thermal engine output (MrqTMMax) and total torque commanded (MrqTot). A low select 118 is connected between the first control loop 114 and the second control loop 116 to command the thermal engine 104 with the lower of the responses commanded from the first and second control loops 114, 116. While torque is used herein as an example of response used for feedback control, those skilled in the art will readily appreciate that any suitable response can be used, such as speed, power, or the like, without departing from the scope of this disclosure.

A third control loop 120 is connected in parallel with the first and second control loops 114, 116 for commanding speed of the thermal engine 104 (and/or the propeller 108). The third control loop 120 outputs a speed control enable or disable status of the speed controller 122. A high selector 124 is connected between combined output of the third control loop/speed controller 120, 122 (anded by anding component 160) and the low selector 118 to output MrqTM (torque demanded from the thermal engine 104). Sensor feedback 128 from the RGB is combined with sensor feedback from the electric motor (MfbEM in FIG. 1) at box 130 to determine torque feedback from the thermal engine, Mfb_TM. The prioritization component selects the correct commanded or requested torque MrqTM from among the first, second, and third control loops 114, 116, 120. The requested or commanded torque MrqTM is summed/differenced with the torque feedback from the thermal engine MfbTM at component 134, which outputs the error between the two (MrqTM and MfbTM). This sum/difference is passed to the major control loop 136, which outputs WfRq (fuel flow required to the thermal engine 104) to the minor control loop 138, which outputs Wf (actual fuel flow going to the thermal engine 104) to the thermal engine 104.

A fourth control loop 126 is connected in parallel with the first, second, and third control loops 114, 116, 120 for commanding the electric motor 106 with non-zero demand when the second control loop 116 is above control to add response (e.g. torque) from the electric motor 106 to response (e.g. torque) from the thermal engine 104 to achieve the response commanded. Commanding the electric motor 106 includes controlling electrical power supplied to the electric motor 106. The fourth control loop 126 outputs MrqEM, requested torque for the electric motor 106. This is summed/differenced with feedback 140 from the electric motor 106 at component 142, which outputs the error between the two (MrqEM, MfbRM). This sum/difference is passed through the major loop control 144, which outputs iEMrq (current commanded by the electronic powertrain controller or EPC) to the minor loop control 146, which outputs iEM (actual current going to the EPC) to the electric motor 118.

The first control loop 114 includes a proportional-integral-derivative (PID) integrator 148 that receives as input the output of a summation/differencing component 150. The component 150 receives total torque demanded or commanded MrqTot and torque feedback of the thermal engine 104 MfgTM, and outputs the sum/difference to the integrator 148. The integrator 148 outputs to the low selector 118.

The second control loop 116 includes a PID integrator 152 that receives the output of a summation/differencing component 154. The component 154 receives maximum torque output of the thermal engine 104 (MrqTMmax) and torque feedback of the thermal engine 104 (MfgTM), and outputs the sum/difference to the integrator 152. The integrator 152 outputs to the low selector 118 for selection of the lower of the two outputs of the first and second control loops 114, 116 as described above.

The speed controller 122 of the third control loop 120 incudes a PID integrator 156 that receives the output of a summation/differencing component 158. The component 158 receives propeller speed commanded or required (Nrq) and actual propeller speed feedback (Nfb), and outputs the sum/difference to the integrator 156. The integrator 156 outputs to the anding component 160 to the integral output is anded with the beta mode input of the third control loop 120 a described above. The beta mode in this context, and the box labeled "Beta Mode" in FIG. 1, refer to speed control mode for the engine control system.

The fourth control loop 126 includes a PID integrator 162 that receives the output of a summation/differencing component 164. The component 164 receives the difference between total torque demanded or commanded and maximum torque output of the thermal engine 104 (MrqTot minus MrqTMmax) and sums/differences this with torque feedback of the electric motor 106 (MfbEM) to outputs the sum/difference to the integrator 162. The integrator 162 outputs to the 142 as described above.

The methods herein include constantly resetting a respective integrator 148, 152, 156, 162 to the value of the loop in control, defined as the loop whose torque request is selected as MrqTM based on the prioritization component 132, while the respective control loop is running in the background and is not actively commanding, thus preventing integrator windup error and assuring seamless transition between loops actively controlling the thermal engine 104. The respective integrators 148, 152, 156, 162 are reset with a respective reset command ("Loop in ctrl" in FIG. 1) once a respective control loop 114, 116, 120 begins actively commanding.

For each control loop 114, 116, 120, 126, the PID control integrator path (including the respective integrator 148, 152, 156, 162) is reset to the value of the loop in control. For example if the first control loop 114 is in control (meaning MrqTM=signal from the integrator 148 of the first control loop 114 (Loop 1 in FIG. 1), the integrators 152, 156 of the PID controllers for the second and third control loops 116, 122 (Loops 2 and 3 in FIG. 1) are reset to the value of the signal coming from the PID controller (intergrator 148) of the first control loop 114 (Loop 1 in FIG. 1). This is indicated in FIG. 1 for each of the integrators 148, 152, 156 by the respective arrow designated "Loop in ctl."

Potential benefits of this disclosure include the following. It is possible to control the power demand of a hybrid-electric powerplant without any abrupt transitions between control loops. The parallel control loops can ensure continuous control of the propulsion system. This architecture can provide an opportunity to adjust the overall system power response of the hybrid-electric powerplant by adjusting the gains and constants of the individual control loops. This can also allow for switching commands from energy/torque demand to a particular engine or propeller speed command.

The methods and systems of the present disclosure, as described above and shown in the drawings, provide for controlling hybrid-electric powerplants such as for driving air movers for aircraft thrust. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A system comprising:
a hybrid-electric powerplant for an aircraft, the hybrid-electric powerplant including a thermal engine and an electric motor each operatively connected together in parallel to a combining gear box to provide torque to drive an air mover for thrust, the combining gear box being connected to the air mover via a reduction gear box;
a first control loop connected for commanding the thermal engine based on an error between a total response commanded for the hybrid-electric powerplant and a total response output from the hybrid-electric powerplant;
a second control loop connected in parallel with the first control loop for commanding the thermal engine based on an error between a maximum thermal engine output and the total response commanded for the hybrid-electric powerplant, sensory feedback from the reduction gear box being combined with sensory feedback from the electric motor to determine a torque feedback from the thermal engine, commanding the thermal engine including controlling fuel flow to the thermal engine;
a low selector connected between the first control loop and the second control loop to command the thermal engine for the lower of responses commanded from the first and second control loops;
a third control loop connected in parallel with the first and second control loops for commanding engine/air mover speed, wherein the third control loop outputs a speed control enable or disable status;
a high selector connected between output of the third control loop and the low selector; and
a fourth control loop connected in parallel with the first, second, and third control loops for commanding the electric motor with a non-zero demand when the second control loop is in control to add a response from the electric motor to a response from the thermal engine to achieve the total response commanded for the hybrid-electric powerplant,
wherein:
each of the first, second, third and fourth control loops is configured to run while not actively commanding;
the first control loop includes a first integrator configured to be reset while the first control loop is running and not actively commanding;
the second control loop includes a second integrator configured to be reset while the second control loop is running and not actively commanding;
the third control loop includes a third integrator configured to be reset while the third control loop is running and not actively commanding; and
the fourth control loop includes a fourth integrator configured to be reset while the fourth control loop is running and not actively commanding.

2. The system as recited in claim 1, wherein the air mover is a propeller.

3. The system as recited in claim 1, wherein the first integrator is configured to be reset by one of the second control loop, the third control loop or the fourth control loop that is actively commanding.

4. The system as recited in claim 1, wherein the second integrator is configured to be reset by one of the first control loop, the third control loop or the fourth control loop that is actively commanding.

5. The system as recited in claim 1, wherein the third integrator is configured to be reset by one of the first control loop, the second control loop or the fourth control loop that is actively commanding.

6. The system as recited in claim 1, wherein the fourth integrator is configured to be reset by one of the first control loop, the second control loop or the third control loop that is actively commanding.

* * * * *